S. J. DICKEY.
WATER GAS APPARATUS.
APPLICATION FILED JULY 16, 1908.
940,925.
Patented Nov. 23, 1909.
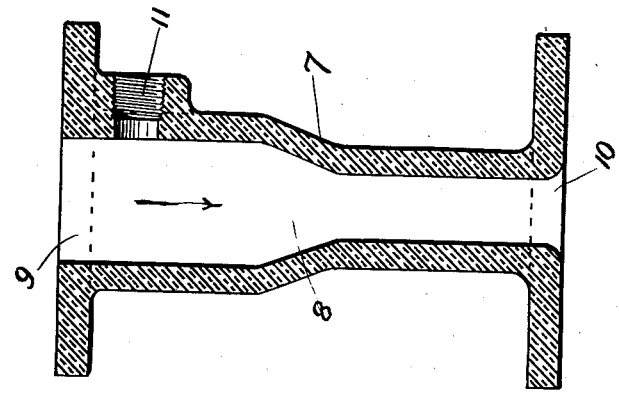
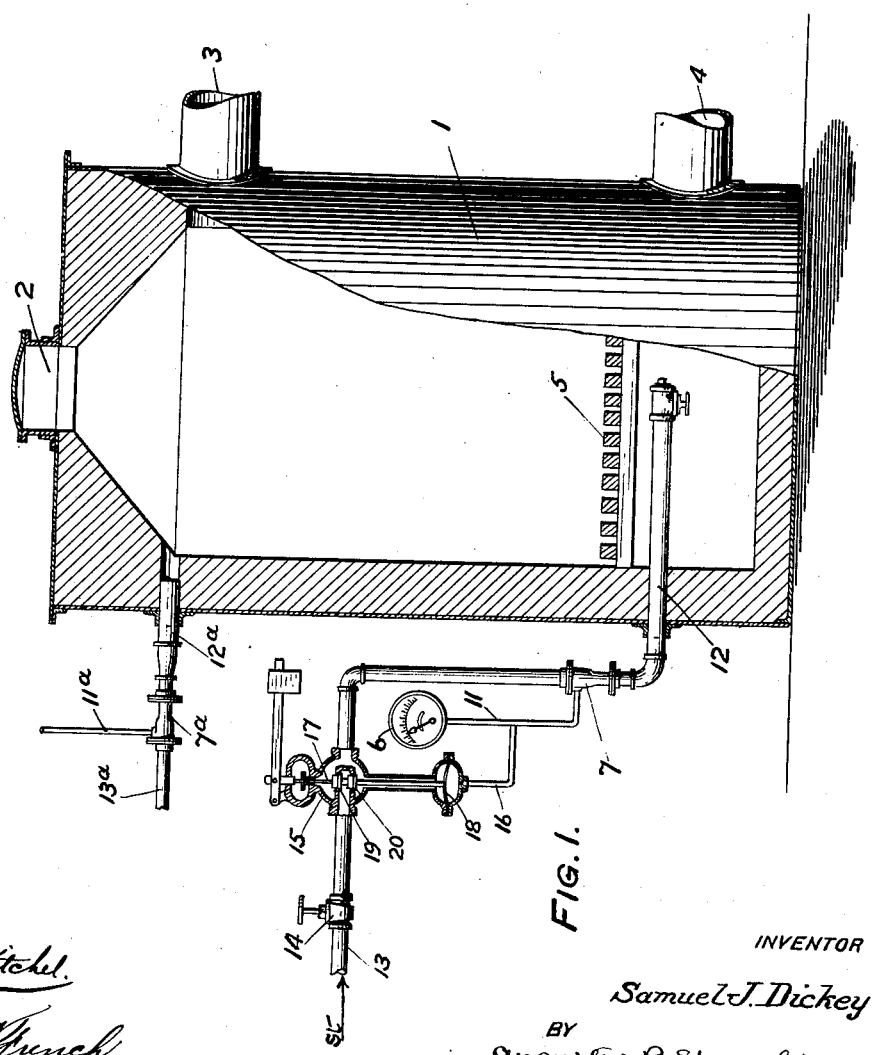
WITNESSES:
INVENTOR
Samuel J. Dickey
BY
Augustus B. Stoughton
ATTORNEY.

UNITED STATES PATENT OFFICE.

SAMUEL J. DICKEY, OF PHILADELPHIA, PENNSYLVANIA, ASSIGNOR TO THE UNITED GAS IMPROVEMENT COMPANY, OF PHILADELPHIA, PENNSYLVANIA, A CORPORATION OF PENNSYLVANIA.

WATER-GAS APPARATUS.

940,925.

Specification of Letters Patent. Patented Nov. 23, 1909.

Application filed July 16, 1908. Serial No. 443,892.

*To all whom it may concern:*

Be it known that I, SAMUEL J. DICKEY, a citizen of the United States, residing at Philadelphia, in the county of Philadelphia and State of Pennsylvania, have invented certain new and useful Improvements in Water-Gas Apparatus, of which the following is a specification.

The principal object of the present invention is to provide simple and easily readable means for definitely controlling the quantity and quality of the production of gas. By these means the attendant is enabled to introduce a definite volume of steam, or otherwise expressed, quantity of water, per predetermined volume of gas made during the intervals of each run regardless of other conditions; so that there may not be too much or too little steam and consequent waste of heat, undue heating or cooling of the fire or injury to the quality of the gas or other troubles and so that the gas making process as a whole is effected under conditions productive of the best results and the apparatus is worked economically and efficiently.

The invention will be claimed at the end hereof but will first be described in connection with the accompanying explanatory drawings showing one but not the only embodiment of the invention.

Figure 1, is an elevational view partly in section illustrating apparatus embodying features of the invention, and Fig. 2, is a sectional view drawn to an enlarged scale and illustrating the meter tube detached.

In the drawings 1, is the generator of the well known water gas producing apparatus. It is shown as provided with a charging opening 2, and with off-takes 3 and 4.

5, is a grate upon which there is a bed of fuel that is supplied with air during the blow in order to heat it. The means for supplying air are well understood and are not shown. During the run steam is passed through the bed of fuel and water gas is produced. This is all well understood. To accomplish the best results the proper proportion of steam introduced to waster gas made should be maintained; for example, thirty pounds of water per 1,000 cubic feet of carbureted gas made is appropriate for average fuels and operating conditions. If too much steam is introduced it cools the fire, heat is wasted and the quality of the gas is impaired. If too little steam is introduced the fire gets too hot, the quality of the gas is impaired, fuel is wasted and other troubles are encountered.

The present invention provides means by which the attendant can by reference to the gage 6, read the quantity of steam introduced, for example, in pounds per minute. Steam entering the generator is caused to pass through the meter tube 7, which may be called also a calibrated tube and which consists of an internally bell shaped body 8, having inlet and outlet portions 9 and 10, corresponding with the large and small ends of the bell shaped body and having at its inlet portion 9, a connection 11, to the gage 6. The outlet end 10, is connected by a pipe 12, which discharges beneath the grate. There is no substantial back pressure on the generator side of the outlet 10. The quantity of flow through the tube 7, is directly proportionate to the absolute pressure of the steam on the inlet side 9, of the meter tube 7. Since this is true the gage 6, indicates the pressure (and since the pressure is directly proportional to the quantity of flow) also the quantity of water or its equivalent in steam entering the generator per unit of time so that the attendant need refer but to the single gage which gives him a direct reading.

The steam supply pipe 13, as from a boiler is provided with a supply valve 14, and may be provided with an automatic pressure regulator 15, which when present makes any variation in pressure of the steam supply, as variation in boiler pressure, immaterial so far as the action of the meter tube 7, is concerned. Furthermore when the automatic pressure regulator 15, is present and properly adjusted the supply valve 14, may be opened wide at each run, because the regulator supplies constant pressure to the meter 7, and the volume passed by the meter is proportional to this pressure. If the automatic regulator is absent the attendant by any necessary manipulation of the valve 14, keeps the pressure upon the meter tube 7, appropriate for passing the required quantity of water or volume of steam which latter fact is ascertained from the direct reading of the gage. The quantity or volume of steam is proportional to the pressure as has been stated. The parts marked with the exponent "a" correspond with the parts of like number which have been described, but they constitute a steam supply above instead of below the grate 5.

Inasmuch as the pressure at the inlet part 9, of the meter tube should be capable of being kept constant at any desired point the automatic pressure regulator 15, is connected by a pipe 16, to the part 9, of the meter tube. As shown the pipe 16, is connected with the pipe 11. The type of automatic pressure regulator chosen for illustration comprises an adjustably weighted spindle 17, connected with a diaphragm 18, and having valves 19 and 20. This type of automatic pressure regulator is well understood and it operates to keep the pressure constant at the inlet end 9, of the meter tube.

When the automatic pressure regulator is present and properly set, it serves to keep the pressure of steam in the inlet side of the meter tube constant and appropriate for causing the gage 6, to indicate that the required quantity of steam is passing per unit of time. Under these circumstances all that is necessary is for the attendant to open the valve 14, at the beginning and to close it at the end of the run. Of course reference to the gage will show that the parts are operating properly and that the required volume of steam is passed to the generator. If the boiler or other steam supply pressure varies, such variation is taken care of by the ordinary action of the pressure regulator. If the pressure regulator is not present, the attendant may watch the gage 6, and manipulate the valve 14, so as to keep the gage at the point corresponding to the volume of steam required during the run.

From the foregoing description it is evident that the invention includes not only the meter tube for measuring steam but also the combination of means for communicating by pressure the volume of fluid per unit of time passing through it with a controlling device which is responsive to such change of pressure and operates to increase or diminish the supply of fluid and this whether the fluid be steam or other fluid substance and whether the measuring means be a meter tube or its equivalent.

What I claim is:

1. Means for definitely controlling the quantity and quality of the production of gas which means comprise the gas generating apparatus and its regulable steam connection and a meter tube interposed in said connection and provided with a gage whereby the attendant is enabled to introduce a definite volume of steam during the interval of each run, substantially as described.

2. Means for definitely controlling the quantity and quality of the production of gas which means comprise the gas generating apparatus, a steam connection thereto, a meter tube interposed in said connection and provided with a pressure gage, and an automatic pressure regulator interposed in said connection and responsive to pressure at the inlet of said tube whereby a definite volume of steam is introduced during the interval of each run, substantially as described.

3. Means for controlling the quantity and quality of the production of gas which means comprise the combination of the gas generating apparatus, a fluid connection thereto, means operatively attached to said connection and adapted to exert pressure proportional to the volume of fluid per unit of time passing through it, and a regulator automatically responsive to the pressure of said means and adapted to increase and diminish the flow through said connection.

4. Means for controlling the quantity and quality of the production of gas which means comprise the combination of the gas generating apparatus, a fluid connection thereto, means interposed in said connection and adapted to indicate by pressure the volume of fluid per unit of time passing through it, and a regulator automatically responsive to the pressure of said means and adapted to increase and diminish the flow signed my name.

In testimony whereof I have hereunto signed my name.

SAMUEL J. DICKEY.

Witnesses:
E. D. CLARY,
JENNIE ADOLPHSON.